United States Patent
Douglas (10) Patent No.: US 7,866,440 B2
(45) Date of Patent: Jan. 11, 2011

(54) SYSTEM FOR JOINING ACOUSTIC CELLULAR PANEL SECTIONS IN EDGE-TO-EDGE RELATION

(75) Inventor: Alan Richard Douglas, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 900 days.

(21) Appl. No.: 11/459,218

(22) Filed: Jul. 21, 2006

(65) Prior Publication Data

US 2008/0017442 A1    Jan. 24, 2008

(51) Int. Cl.
  *F02K 1/00* (2006.01)
  *E04B 1/82* (2006.01)
  *B64D 33/02* (2006.01)
  *B64F 1/26* (2006.01)

(52) U.S. Cl. ............ 181/213; 181/210; 181/214; 181/292

(58) Field of Classification Search ............ 181/213, 181/214, 210, 292
See application file for complete search history.

(56) References Cited

U.S. PATENT DOCUMENTS

| | | | | |
|---|---|---|---|---|
| 3,579,942 A | * | 5/1971 | Cole | 52/787.12 |
| 4,235,303 A | * | 11/1980 | Dhoore et al. | 181/214 |
| 5,581,054 A | * | 12/1996 | Anderson et al. | 181/213 |
| 5,768,778 A | * | 6/1998 | Anderson et al. | 29/888.01 |
| 5,938,875 A | * | 8/1999 | Jessup et al. | 156/79 |
| 6,017,413 A | * | 1/2000 | Franklin et al. | 156/304.2 |
| 6,123,170 A | * | 9/2000 | Porte et al. | 181/214 |
| 6,290,021 B1 | * | 9/2001 | Strandgaard | 181/290 |
| 6,360,989 B1 | * | 3/2002 | Maguire | 244/53 B |
| 6,761,245 B2 | * | 7/2004 | Porte | 181/210 |
| 6,772,857 B2 | * | 8/2004 | Porte et al. | 181/210 |
| 6,857,669 B2 | * | 2/2005 | Porte et al. | 285/368 |
| 6,896,099 B2 | * | 5/2005 | Porte et al. | 181/214 |
| 6,920,958 B2 | * | 7/2005 | Harrison | 181/214 |
| 7,296,656 B2 | * | 11/2007 | Sanicki et al. | 181/210 |
| 7,797,809 B2 | * | 9/2010 | Costa et al. | 29/458 |
| 2008/0179448 A1 | * | 7/2008 | Layland et al. | 244/1 N |

FOREIGN PATENT DOCUMENTS

GB    2065766    1/1981

* cited by examiner

*Primary Examiner*—Elvin G Enad
*Assistant Examiner*—Christina Russell
(74) *Attorney, Agent, or Firm*—Womble Carlyle Sandridge & Rice, PLLC (57) ABSTRACT

The invention includes a joint assembly for connecting first and second longitudinal edges of portions of an acoustic barrel or panel having an open cell core, a perforated inner skin, and an outer skin. The joint assembly includes at least one strip covering a plurality of openings in walls of cells along the first and second longitudinal edges. The strip is separate from the inner and outer skins. A plate includes a first portion connected to the outer skin proximate to the first longitudinal edge, and a second portion connected to the outer skin proximate to the second longitudinal edge.

19 Claims, 7 Drawing Sheets

SYSTEM FOR JOINING ACOUSTIC CELLULAR PANEL SECTIONS IN EDGE-TO-EDGE RELATION

FIELD OF THE INVENTION

The invention relates to acoustic panels for aircraft, and more particularly relates to a system for joining edges of one or more acoustic panel sections to maximize the effective acoustic area of the panel sections that is available for noise attenuation.

BACKGROUND

Sound absorbing panels or liners often are used to form the inner barrels of the inlets of jet engine nacelles to attenuate noise generated by the engine's fan blades. Such panels or liners often include an acoustic cellular core disposed between a perforated inner skin, and an imperforate outer skin. The perforated inner skin permits sound waves to enter the innermost ends of the open cells of the core, and the imperforate outer skin reflects the sound waves. Such an arrangement is known to dissipate sound energy. Generally, the greater the open area of the perforated inner skin and the greater the number and volume of open cells in the acoustic cellular core available to receive sound waves through the perforated inner skin, the greater the sound attenuation capability of an acoustic inner barrel of a nacelle inlet.

Figure 1:
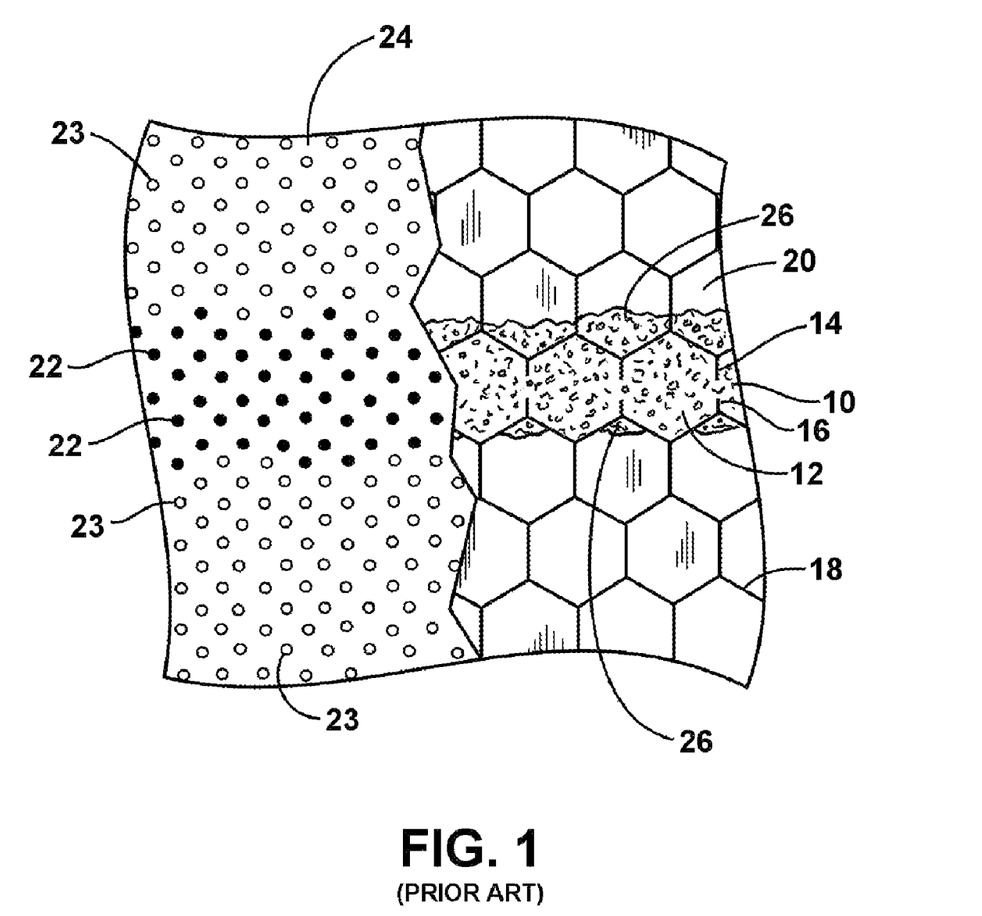
FIG. 1 is a plan view of a prior art joint that includes a foaming adhesive to connect adjoined edges of acoustic cellular panels.

Typically, an acoustic inner barrel of a nacelle includes a plurality of circumferential acoustic barrel segments or panels. When the segments are joined together along longitudinal seams, they form a complete acoustic inner barrel. Historically, the adjoining edges of the acoustic cellular cores of the segments have been connected by a foaming adhesive of a type known to persons of ordinary skill in the art. As shown in FIG. 1, the foaming adhesive 10 typically fills partial cells 12 along adjoined cut edges 14, 16 of the acoustic cellular core sections 18, 20. The foaming adhesive 10 also can at least partially fill adjacent full cells 26. The foaming adhesive 10 also typically blocks at least some openings 22 in the perforated inner skin 24 along the joint. Accordingly, the foaming adhesive 10 effectively prevents sound waves from passing through at least some of the openings 22 in the inner skin 24, and also prevents sound waves from entering the blocked and partially blocked cells 12, 26 of the core sections 18, 20. As a result, the sound attenuation capability of the associated acoustic inner barrel is less than it would be if the openings 22 and cells 12, 26 remained unblocked by the foaming adhesive 10.

Figure 2:
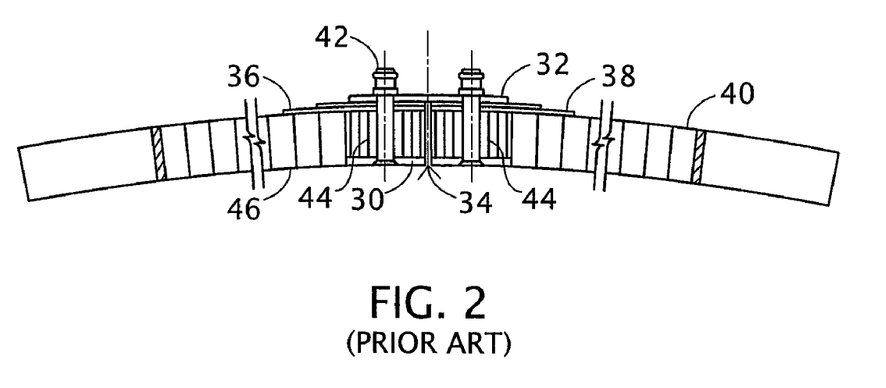
FIG. 2 is a cross-sectional view of a prior art mechanical joint for connecting edges of acoustic cellular panels.

Mechanical joints also have been used to connect adjoining edges of acoustic panels. As shown in FIG. 2, such a mechanical joint includes an inner plate 30 and an outer plate 32 on opposed sides of a longitudinal joint 34 between first and second portions 36, 38 of an acoustic barrel 40. A plurality of fasteners 42 extend thorough the barrel portions 36, 38 and the inner and outer plates 30, 32, and secure the barrel portions 36, 38 together. Unfortunately, the inner plate 30 necessarily blocks openings in the perforated inner skin 46, and prevents sound waves from entering the underlying cells 44. Therefore, like the foaming adhesive discussed above, the mechanical connection shown in FIG. 2 effectively reduces the available acoustic area of the inner barrel 40 that is available for sound attenuation.

Accordingly, there is a need for a joining method and system for connecting adjoined edges of acoustic cellular panels that minimizes the blockage of openings in the inner skin and of cells proximate to the joint. In addition, there is a need for such a joining method and system that provides a strong and durable connection between the acoustic panels or segments.

SUMMARY

The invention includes an acoustic barrel for an engine nacelle inlet. The acoustic barrel includes a first longitudinal edge defined by a first cellular core portion disposed between a first perforated inner skin portion and a first outer skin portion, and a second longitudinal edge defined by a second cellular core portion disposed between a second perforated inner skin portion and a second outer skin portion. A plurality of first edge cells are disposed along the first longitudinal edge, and a plurality of second edge cells are disposed along the second longitudinal edge. Each of the first and second edge cells are characterized by a cell wall opening proximate their respective longitudinal edge. At least one strip extends along and substantially covers the cell wall openings in the first and second edge cells. The strip is separate from the first inner and outer skin portions. At least one plate extends between and along the first and second longitudinal edges, and is attached to the first and second outer skin portions by a plurality of blind fasteners proximate to the first and second longitudinal edges.

The invention also includes a method of maximizing the available acoustic area of an engine nacelle inner barrel having an acoustic cellular core, a perforated inner skin, an outer skin, and at least one longitudinal seam extending between first and second cut edges of the acoustic cellular core. The method includes sealing the first cut edge of the cellular core such that substantially all of the cells along the first cut edge are unobstructed and available for noise attenuation. The method further includes sealing the second cut edge of the cellular core such that substantially all of the cells along the second cut edge are unobstructed and available for noise attenuation. The method also includes splicing the first and second edges together by attaching at least one plate to the outer skin across the seam with at least one blind fastener on each side of the seam.

The invention further includes a joint assembly for connecting first and second longitudinal edges of portions of an acoustic barrel having an open cell core, a perforated inner skin, and an outer skin. The joint assembly includes at least one strip covering a plurality of openings in walls of cells along the first and second longitudinal edges, the strip being separate from the inner and outer skins. A splice plate has a first portion connected to the outer skin proximate to the first longitudinal edge, and a second portion connected to the outer skin proximate to the second longitudinal edge.

The invention also includes an acoustic inner barrel for an engine nacelle inlet having an acoustic cellular core, an inner skin, an outer skin, and at least one longitudinal seam. The barrel includes means for covering openings in cell walls of a plurality of partial cells along the longitudinal seam. The means for covering is separate from the inner and outer skins. The barrel further includes means for connecting opposed edges of the barrel along the seam. The means for connecting is configured to leave cells along the longitudinal seam substantially unobstructed.

These and other aspects of the invention will be understood from a reading of the following detailed description together with the drawings.

DETAILED DESCRIPTION

Figure 3:
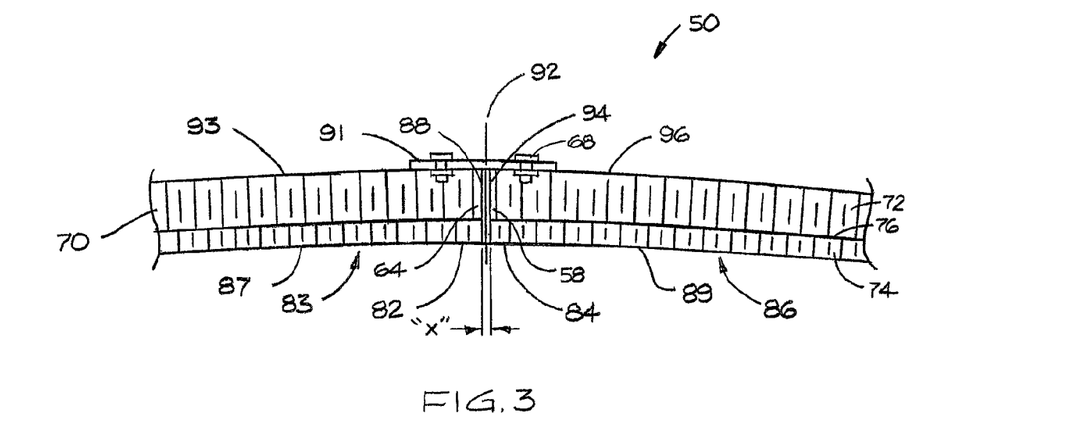
FIG. 3 is a cross-sectional view of one embodiment of a joining method and system according to the invention for connecting edges of acoustic cellular panels.

FIG. 3 shows one embodiment of a joining system 50 according to the invention for joining first and second longitudinal edges 82, 84 of first and second portions 83, 86 of an acoustic barrel 90. In one embodiment, the acoustic barrel 90 is an inner barrel or liner of an inlet section of a jet engine nacelle. The first and second longitudinal edge portions 82, 84 of the first and second barrel portions 83, 86 are arranged in edge-to-edge relation along a seam 92. Both the first and second barrel portions 83, 86 include an acoustic cellular core 70. In the embodiment shown, the acoustic cellular core 70 has a double-degree-of freedom arrangement of a type known to persons of ordinary skill in the art. Alternatively, the core 70 can be of the single-degree-of-freedom type, or a different multiple-degree-of-freedom type (not shown in the figures). The core 70 includes an innermost array of cells 74, an outer array of cells 72, and a sound permeable septum 76 therebetween. The first and second barrel portions 83, 86 also each include a perforated inner skin 87 on an inside face of the acoustic core 70, and an imperforate outer skin 93. The inner skin 87 includes a plurality of spaced openings 23 that permit sound waves to pass through the inner skin 87 to the cells 72, 74 of the acoustic cellular core 70. (See FIG. 5)

Figure 4:
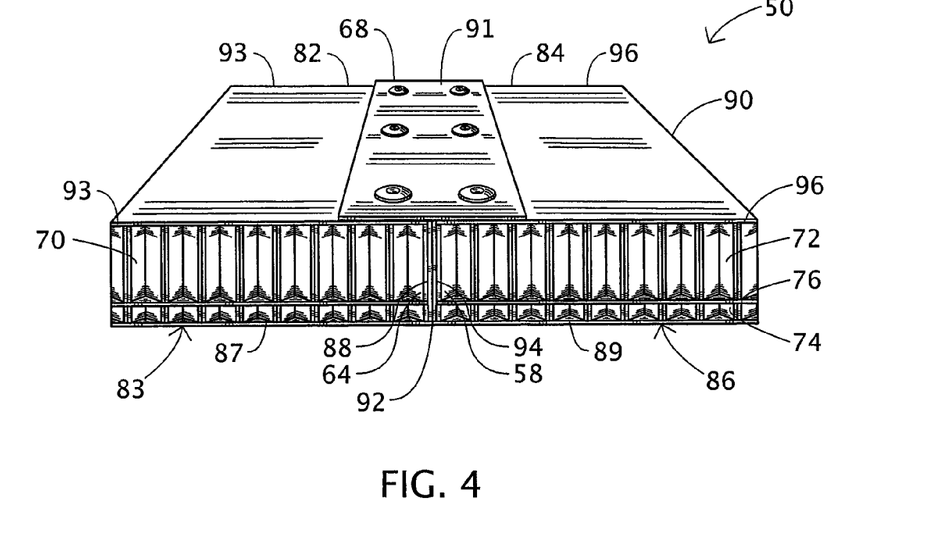
FIG. 4 is a perspective view of the joining method and system of FIG. 3 showing the outside face of the joint.
Figure 5:
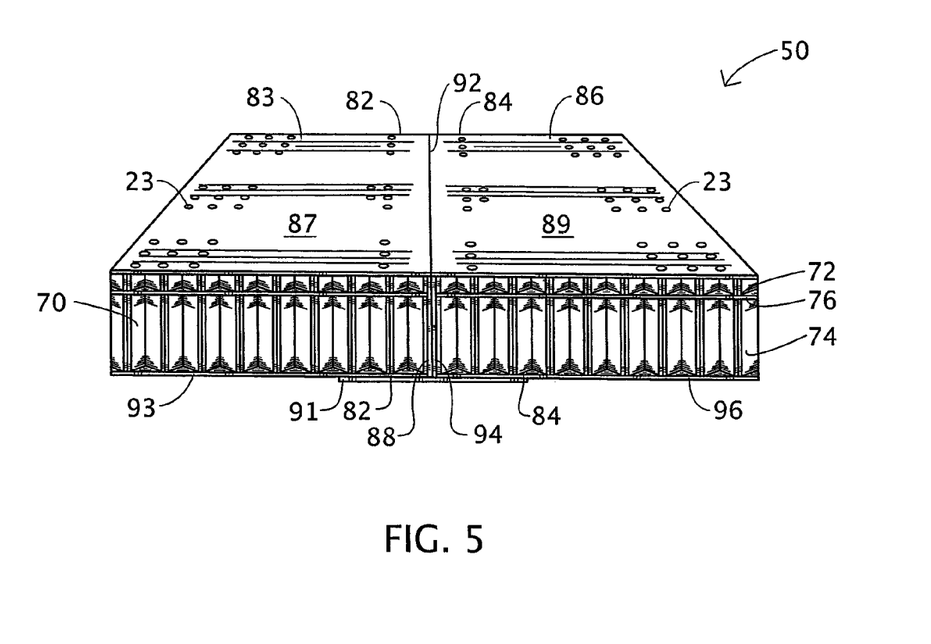
FIG. 5 is a perspective view of the joining method and system of FIGS. 3 and 4 showing the inside face of the joint.
Figure 6:
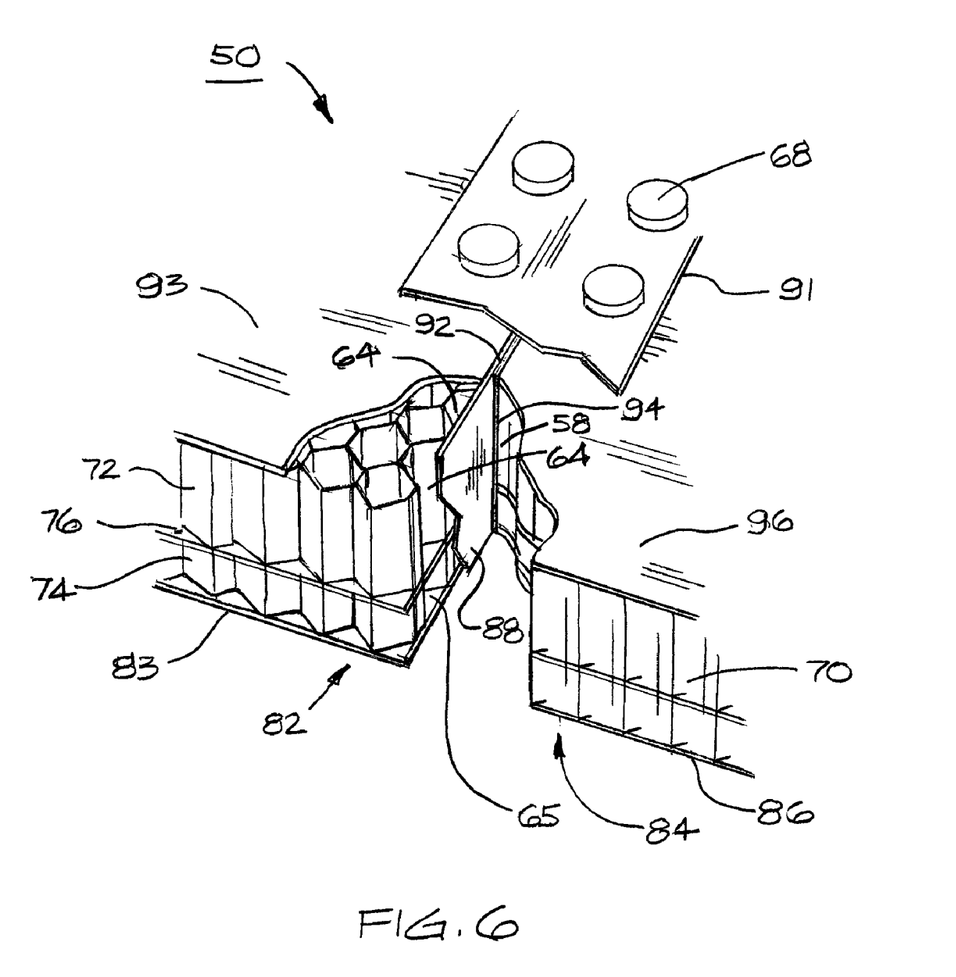
FIG. 6 is a perspective view of the joining method and system of FIGS. 3-5 with portions removed to show hidden details of the joint.

As shown in FIG. 3, a first plurality of partial edge cells 64 extend along the first longitudinal edge 82, and a second plurality of partial edge cells 58 extend along the second longitudinal edge 84. As shown in FIG. 6, at least some of the edge cells 64, 58 of the acoustic core 70 include openings 65 in their cell walls formed when the edge portions 82, 84 and acoustic cellular core 70 of the first and second barrel portions 83, 86 are cut. As also shown in FIG. 6, the edge cells 64, 58 can be open and substantially undamaged. Edge strips 88, 94 are attached along the longitudinal edges 82, 84, and cover the openings 65 in the cell walls of their respective edges 82, 84. The edge strips 88, 94 may be constructed of any suitable and thin material. In one embodiment, the edge strips 88, 94 are about 0.003 inch to about 0.02 inch thick, though the strips 88, 94 may be thinner or thicker if desired. The edge strips 88, 94 can be constructed of a metallic material such as aluminum or titanium foil, a composite material such as graphite-epoxy, or the like. As seen in FIGS. 4-6, the edge strips 88, 94 are imperforate, being devoid of the openings 23 present in face sheet 87. The edge strips 88, 94 are also distinct from, i.e., are not part of, the face sheet 87. The edge strips 88, 94 are adhered to the exposed cell walls along the edges of the cellular core 70 by a non-foaming adhesive. For example, the edge strips 88, 94 can be bonded to the cell walls with 3M® Scotch-Weld® Epoxy Adhesive EC-2216 B/A, or another adhesive material having comparable peel and sheer strengths. The combined thickness of the edge strips 88, 94 is indicated in FIG. 3 by dimension X. Preferably, X is less than or equal to about 0.12 inch. Accordingly, the thin edge strips 88, 94 only occupy an extremely small portion of the inner circumference of the acoustic barrel 90, and thereby maximize the available acoustic area of the barrel 90. Using methods known to persons of ordinary skill in the art, the edge strips 88, 94 are adhered along the longitudinal edges 82, 84 such that substantially no adhesive fills or partially fills the edge cells 58, 64. Accordingly, the partial edge cells 58, 64 remain substantially open, and thus are available for purposes of sound attenuation.

Figure 7:
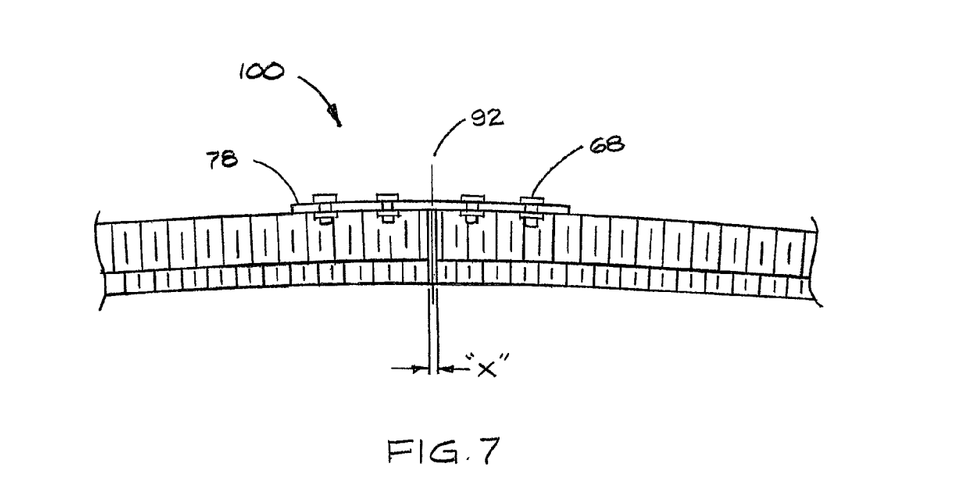
FIG. 7 is a cross-sectional view of another embodiment of a joining method and system according to the invention.

As shown in FIGS. 3, 4 and 6, a plate 91 is positioned along the seam 92 on the outer skins 93, 96 of the abutted edge portions 82, 84. The plate 91 can be constructed of metal, such as aluminum, titanium, or a nickel-based alloy such as Inconel®. In one embodiment, the plate 91 is constructed of Aluminum 2024, and has a thickness of about 0.09 inch. Alternatively, the plate 91 can be constructed of a composite material, such as graphite-epoxy, or the like. As shown in FIG. 3, the plate 91 is connected to the outer skins 93, 96 of the edge portions 82, 84 on each side of the seam 92. Preferably, the plate 91 is connected to the outer skins 93, 96 of the edge portions 82, 84 on each side of the seam 92 by a plurality of blind fasteners 68. As used herein, the term "blind fastener" refers to a fastener that can be inserted and tightened without access to the inaccessible or blind side of a mating part. As can be seen by comparing FIG. 3 to FIG. 2, unlike the through-bolts 42 and inner plate 30 of prior art mechanical joints, the blind fasteners 68 do not obstruct the cells 72, 74 of the acoustic cellular core 70. In one embodiment, the blind fasteners 68 are blind bolts conforming to either U.S. military specification MS21141U0603 or U.S. military specification MS21141U0604. In this embodiment, as shown in FIGS. 4 and 6, the blind fasteners 68 can be arranged in a single row along each side of the seam 92. In another embodiment of a joining system 100 according to the invention shown in FIG. 7, a wide plate 78 is connected to the outer skins 93, 96 by a plurality of blind fasteners 68 arranged in two rows along each side of the seam 92. The size, type, arrangement, and number of blind fasteners 68 that connect the plates 91, 78 to the outer skins 93, 96 can vary depending upon the in-service load conditions experienced by the joints 50, 100. Alternatively, the plate 91 can be connected to the outer skins 93, 96 of the edge portions 82, 84 on each side of the seam 92 by a suitable adhesive, such as 3M® Scotch-Weld® Epoxy Adhesive EC-2216 B/A, or the like. In another alternative embodiment, the plate 91 can be connected to the outer skins 93, 96 of the edge portions 82, 84 on each side of the seam 92 by a combination of blind fasteners 68 and adhesives.

As shown in FIG. 5, substantially all of the surface area of the inner skins 87, 89 on either side of the seam 92 is unaffected by the joining system 50. In addition, substantially all of the cells 74, 72 of the acoustic cellular core 70 remain unobstructed, and thus available to receive sound waves that enter the cells through openings in the inner skins 87, 89. Accordingly, the joining system 50 maximizes the effective area of the acoustic barrel 90 that is available for the absorption or dissipation of engine noise.

Figure 8A:
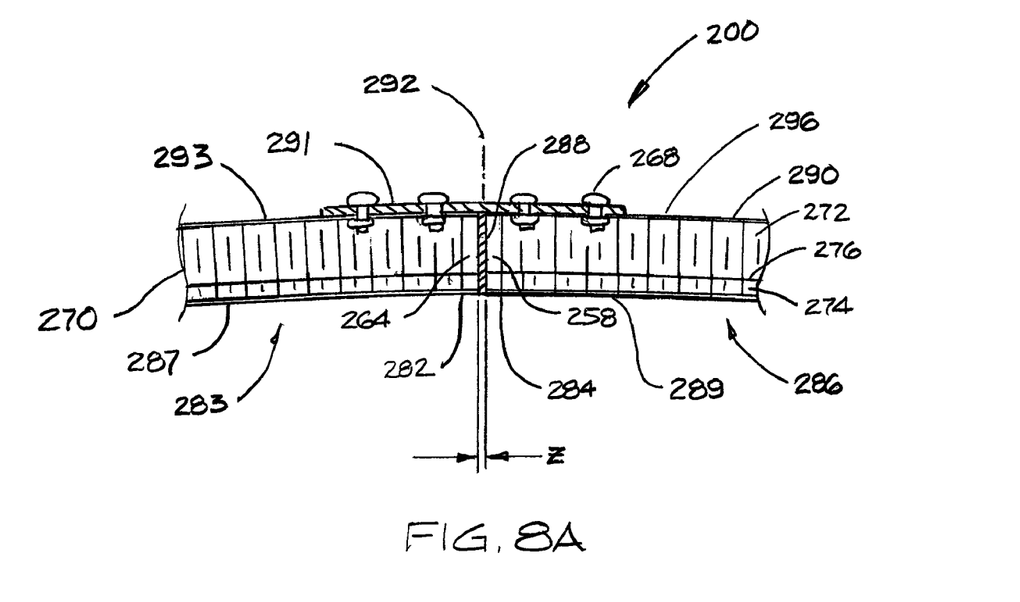
FIG. 8A is a cross-sectional view of another embodiment of a joining method and system according to the invention.

FIG. 8A shows another embodiment of a joining system 200 according to the invention for joining first and second longitudinal edges 282, 284 of first and second portions 283, 286 of an acoustic barrel 290. The first and second longitudinal edge portions 282, 284 of the first and second barrel portions 283, 286 are arranged in edge-to-edge relation along a seam 292. Both the first and second barrel portions 283, 286 include an acoustic cellular core 270. In the embodiment shown, the acoustic cellular core 270 has a double-degree-of-freedom arrangement of a type known to persons of ordinary skill in the art. Alternatively, the core 270 can be of the single-degree-of-freedom type, or a different multiple-degree-of-freedom type (not shown in the figures). In the embodiment shown, the core 270 includes an innermost array of cells 274, an outer array of cells 272, and a sound permeable septum 276 therebetween. The first and second barrel portions 283, 286 also each include a perforated inner skin 287 on an inside face of the acoustic core 270, and an imperforate outer skin 293. The inner skin 287 includes a plurality of spaced openings that permit sound waves to propagate through the inner skin 287 to the cells 272, 274 of the acoustic cellular core 270.

As shown in FIG. 8A, a first plurality of partial edge cells 264 extend along the first longitudinal edge 282, and a second plurality of partial edge cells 258 extend along the second longitudinal edge 284. At least some of the edge cells 264, 258 of the acoustic core 270 include openings in their cell walls formed when the edge portions 282, 284 and acoustic cellular core 270 of the first and second barrel portions 283, 286 are cut. In this embodiment, a single filler strip 288 is bonded along the longitudinal edges 282, 284, and covers the openings in the cell walls along both edges. The filler strip 288 can be constructed of any suitable and thin material. In one embodiment, the edge strip 288 is about 0.05 inch thick, and is constructed of a metal such as Aluminum 2024. Alternatively, the filler strip can be a composite material such as graphite-epoxy, or the like. The filler strip 288 is bonded to the exposed cell walls along both edges 282, 284 of the cellular core 270 by a non-foaming adhesive. For example, the filler strip 288 can be bonded to the cell walls with 3M® Scotch-Weld® Epoxy Adhesive EC-2216 B/A. The total width of the filler strip 288 and the bonding adhesive is indicated in FIG. 8A by dimension Z. Preferably, Z is less than or equal to about 0.2 inch. Accordingly, the thin filler strip 288 occupies only and extremely small portion of the inner circumference of the acoustic barrel 290, and thereby maximizes the available acoustic area of the barrel 290. Care is taken during bonding of the filler strip 288 to the longitudinal edges 282, 284 such that substantially no adhesive fills or partially fills the edge cells 258, 264. Thus, the partial edge cells 258, 264 remain substantially open, and thus are available for purposes of sound absorption.

As shown in FIG. 8A, a plate 291 is positioned along the seam 292 on the outer skins 293, 296 of the abutted edge portions 282, 284. The plate 291 can be constructed of metal, such as aluminum, titanium, or a nickel-based alloy such as Inconel®. In one embodiment, the plate 291 is constructed of Aluminum 2024, and has a thickness of about 0.09 inch. Alternatively, the plate 291 can be constructed of a composite material, such as graphite-epoxy, or the like. As shown in FIG. 8A, the plate is connected to the outer skins 293, 296 of the edge portions 282, 284 on each side of the seam 292 by a plurality of blind fasteners 268, such as MS21141U0603 or MS21141U0604 blind bolts. The blind fasteners 268 can be arranged in single or multiple rows along each side of the seam 292. The size, type, arrangement, and number of blind fasteners 268 can vary depending upon the in-service load conditions experienced by the joint 200. As shown in FIG. 8A, substantially all of the surface area of the inner skins 287, 289 on either side of the seam 292 is unaffected by the joining system 200. In addition, substantially all of the cells 274, 272 of the acoustic cellular core 270 remain open, and thus available to contribute to sound absorption/dissipation. Accordingly, the joining system 200 maximizes the effective area of the acoustic barrel 290 that is available for the absorption or dissipation of engine noise.

Figure 8B:
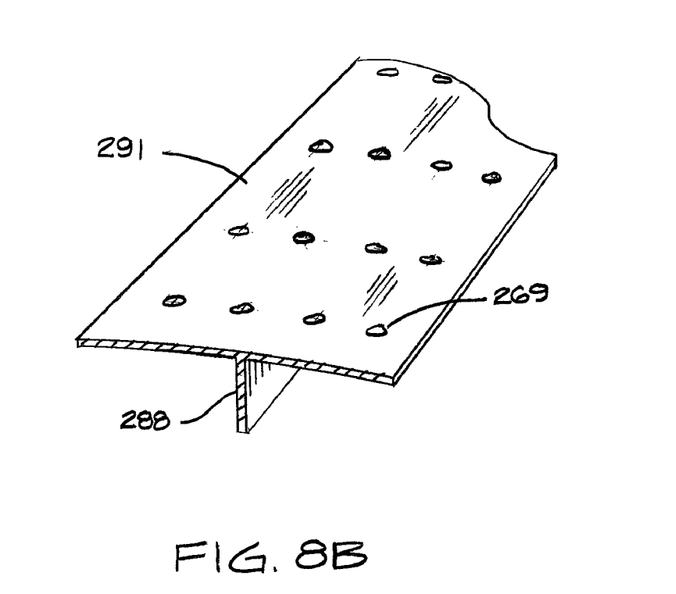
FIG. 8B is a perspective view of a portion of a combined splice plate and filler strip for use in the joining system shown in FIG. 8A.

As shown in FIG. 8B, the plate 291 and filler strip 288 shown in FIG. 8A can be constructed together as a single T-shaped member that provides additional strength and durability of the joint 200. A plurality of spaced openings 269 can be provided in the plate 291 for receiving the blind fasteners 268. However, unlike the plate 291 with its spaced openings 269, and unlike the perforated inner skin 287, the filler strip 288 is imperforate in the region where it is bonded to the exposed cell walls. Both sides of the filler strip are adhesively bonded to the partial edge cells.

Figure 9A:
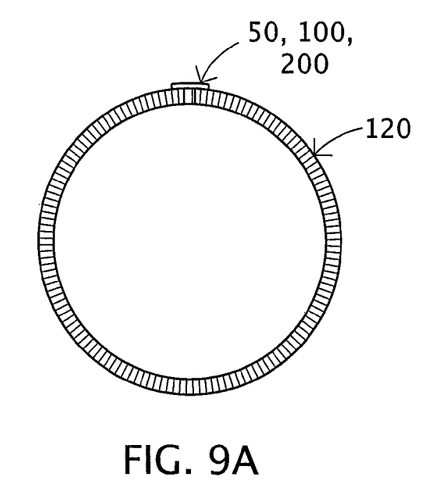
FIG. 9A is cross-sectional view of a one-piece acoustic barrel having edges joined by a joining system according to the invention along a single longitudinal seam.
Figure 9B:
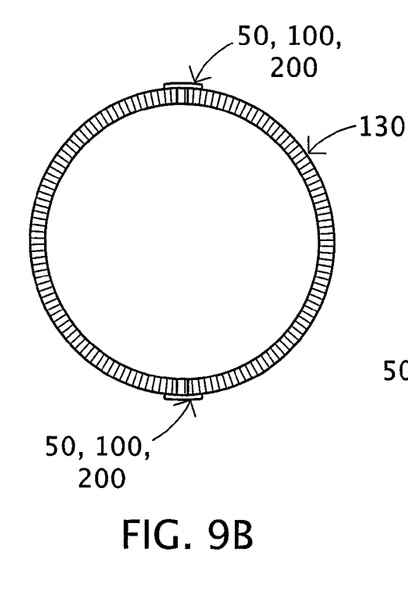
FIG. 9B is cross-sectional view of a two-piece acoustic barrel having edges joined by joining systems according to the invention along two longitudinal seams.
Figure 9C:
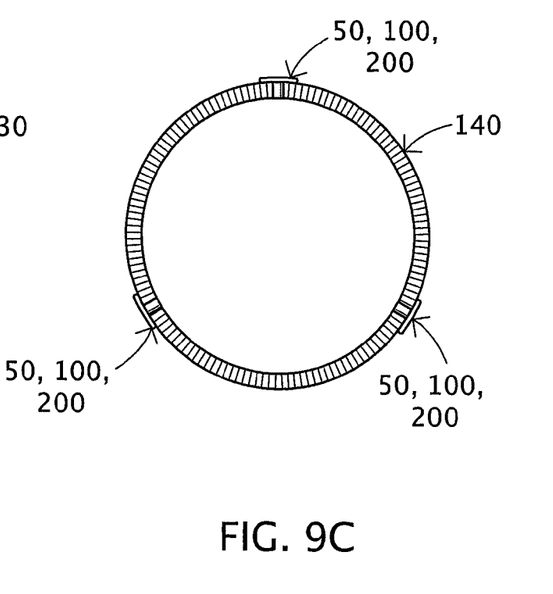
FIG. 9C is cross-sectional view of a three-piece acoustic barrel having edges joined by joining systems according to the invention along three longitudinal seams.

As shown in FIGS. 9A-9C, a joining system 50, 100, 200 like that described above can be used to connect longitudinal edge portions of an acoustic barrel along one or more longitudinal seams. In the arrangement shown in FIG. 9A, the joining system 50, 100, 200 is used to join edge portions of a barrel 120 formed in a single piece. Such an arrangement minimizes the number of longitudinal seams, and thereby maximizes the effective acoustic area of the barrel 120. As shown in FIGS. 9B and 9C, a joining system 50, 100, 200 according to the invention also can be used to join longitudinal edges of barrels 130, 140 having two or more separate barrel segments and plural longitudinal seams.

The above description of various embodiments of the invention is intended for purposes of describing different aspects and features of the invention. Persons of ordinary skill in the art will understand that various changes and modifications can be made to the described embodiments without departing from the scope of the invention. All such changes and modifications are intended to be within the scope of the appended claims.

What is claimed is:

1. An acoustic barrel for an engine nacelle inlet, the acoustic barrel comprising:
   (a) a first longitudinal edge defined by a first cellular core portion disposed between a first perforated inner skin portion and a first outer skin portion;
   (b) a second longitudinal edge defined by a second cellular core portion disposed between a second perforated inner skin portion and a second outer skin portion;
   (c) a plurality of first edge cells along the first longitudinal edge, and a plurality of second edge cells along the second longitudinal edge, at least some of the first and second edge cells being characterized by a cell wall opening proximate to its respective longitudinal edge;
   (d) at least one strip substantially covering the cell wall openings in the first and second edge cells, the strip being imperforate, distinct from the first inner and outer skin portions and adhesively joined to at least a portion of one or both the first edge cells and the second edge cells, such that said one or both the first edge cells and the second edge cells are available for purposes of sound attenuation; and (e) at least one plate extending between and along the first and second longitudinal edges, the plate being attached to the first and second outer skin portions.

2. An acoustic barrel according to claim 1 wherein the strip comprises a first edge strip substantially covering the cell wall openings in the first edge cells, the first edge strip being distinct from the first inner and outer skin portions, and a second edge strip substantially covering the cell wall openings in the second edge cells, the second edge strip being distinct from the first inner and outer skin portions, wherein the first and second edge strips are substantially parallel and define a gap therebetween, and wherein the combined width of the first second edge strips and the gap is less than or equal to about 0.2 inches wide.

3. An acoustic barrel according to claim 1 wherein interior portions of the first and second edge cells are substantially undamaged and include interior portions that are substantially unobstructed and wherein the acoustic attenuation capabilities of the first and second edge cells are not lessened by damage or obstructions.

4. An acoustic barrel according to claim 1 wherein the first and second longitudinal edges define a single longitudinal seam in an otherwise continuous barrel.

5. An acoustic barrel according to claim 1 wherein the first and second longitudinal edges define a longitudinal seam between first and second barrel segments.

6. An acoustic barrel according to claim 1 wherein the at least one plate is attached to the first and second outer skin portions by a plurality of blind fasteners proximate to the first and second longitudinal edges.

7. An acoustic barrel according to claim 6 wherein the blind fasteners comprise blind bolts.

8. An acoustic barrel according to claim 1 wherein the at least one plate is attached to the first and second outer skin portions by an adhesive material.

9. An acoustic barrel according to claim 1 wherein the first and second cellular core portions each include a plurality of cells divided by a perforated septum into first and second cell portions.

10. An acoustic barrel according to claim 1 wherein:
the at least one strip comprises a single filler strip adhered to cell walls and covering the cell wall openings of both the first and second edge cells; and
an outer edge of the filler strip is joined to the plate.

11. An acoustic inner barrel for an engine nacelle inlet having an acoustic cellular core, an inner skin, an outer skin, and at least one longitudinal seam, the barrel comprising:

(a) means for adhesively covering openings in cell walls of a plurality of partial cells along the longitudinal seam such that said plurality of partial cells are available for purposes of sound attenuation, the means for covering being imperforate and distinct from the inner and outer skins; and (b) means for connecting opposed edges of the barrel along the seam, the means for connecting being configured to leave sound receiving ends of the partial cells along the longitudinal seam substantially unobstructed.

12. An acoustic inner barrel according to claim 11 wherein the means for covering comprises at least one edge strip attached to a longitudinal edge of the acoustic cellular core along the seam.

13. An acoustic inner barrel according to claim 11 wherein the means for connecting comprises a plate spanning the seam along the outer skin.

14. An acoustic inner barrel according to claim 13 wherein the means for connecting further comprises a plurality of blind fasteners connecting the plate to the outer skin.

15. An acoustic inner barrel according to claim 11 wherein the means for covering comprises an edge strip adhered to both a first longitudinal edge of the acoustic cellular core on a first side of the longitudinal seam and to a second longitudinal edge of the acoustic cellular core on a second side of the longitudinal seam, wherein the means for connecting comprises a plate extending across the seam and being connected to portions of the outer skin on each side of the longitudinal seam, and wherein an outer edge of the edge strip is connected to the plate.

16. An acoustic inner barrel according to claim 11 wherein the partial cells are substantially undamaged and include interior portions that are substantially unobstructed and wherein the acoustic attenuation capabilities of the partial cells are not lessened by damage or obstructions.

17. An acoustic barrel for an engine nacelle inlet, the acoustic barrel comprising:

(a) a first longitudinal edge defined by a first cellular core portion disposed between a first perforated inner skin portion and a first outer skin portion;

(b) a second longitudinal edge defined by a second cellular core portion disposed between a second perforated inner skin portion and a second outer skin portion;

(c) a plurality of first partial edge cells extending along the first longitudinal edge, and a plurality of second partial edge cells extending along the second longitudinal edge, each of the first and second partial edge cells including a plurality of cell wall openings proximate to its respective longitudinal edge;

(d) a T-shaped member having a plate and filler strip, the filler strip being imperforate, orthogonal to the plate and adhesively contacting the first and second partial edge cells, the filler strip further substantially covering each of the cell wall openings in the first and second edge cells, such that the first and second edge cells are available for purposes of sound attenuation; and (e) the plate extending between and along the first and second longitudinal edges, the plate being attached to the first and second outer skin portions.

18. An acoustic barrel according to claim 17 wherein the plate is attached to the first and second outer skin portions by a plurality of blind fasteners proximate to the first and second longitudinal edges.

19. An acoustic barrel according to claim 17 wherein the first and second cellular core portions each include a plurality of cells divided by a perforated septum into first and second cell portions.

* * * * *